(12) United States Patent
Camera

(10) Patent No.: US 11,518,442 B2
(45) Date of Patent: Dec. 6, 2022

(54) CLAMSHELL STRUCTURAL REINFORCEMENT

(71) Applicant: Zephyros, Inc., Romeo, MI (US)

(72) Inventor: Mike Camera, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 20 days.

(21) Appl. No.: 17/265,401

(22) PCT Filed: Aug. 21, 2019

(86) PCT No.: PCT/US2019/047494
§ 371 (c)(1),
(2) Date: Feb. 2, 2021

(87) PCT Pub. No.: WO2020/041462
PCT Pub. Date: Feb. 27, 2020

(65) Prior Publication Data
US 2021/0269095 A1    Sep. 2, 2021

Related U.S. Application Data

(60) Provisional application No. 62/720,812, filed on Aug. 21, 2018.

(51) Int. Cl.
*B60J 7/00* (2006.01)
*B62D 21/15* (2006.01)
(Continued)

(52) U.S. Cl.
CPC ......... *B62D 21/152* (2013.01); *B62D 25/087* (2013.01); *B62D 27/023* (2013.01); *B62D 27/026* (2013.01)

(58) Field of Classification Search
CPC .......... A61P 25/16; A61P 43/00; B60C 15/06; Y10T 152/10765; Y10T 152/10792;
(Continued)

(56) References Cited

U.S. PATENT DOCUMENTS

| | | | |
|---|---|---|---|
| 6,296,298 B1 | 10/2001 | Barz | |
| 2013/0133771 A1* | 5/2013 | Richardson | B62D 25/04 138/109 |

(Continued)

FOREIGN PATENT DOCUMENTS

| | | |
|---|---|---|
| DE | 102010009354 A1 | 8/2011 |
| DE | 102012012745 A1 | 1/2014 |

(Continued)

OTHER PUBLICATIONS

European Communication Pursuant to Article 94(3) EPC dated Jul. 4, 2022, Application No. 19762630.2.

(Continued)

*Primary Examiner* — Kiran B Patel
(74) *Attorney, Agent, or Firm* — The Dobrusin Law Firm, PC

(57) ABSTRACT

A structural reinforcement, utilized to reinforce a structural joint of a vehicle, and method of reinforcing a structural joint of a vehicle. The structural reinforcement having a clamshell structure comprising two complimentary halves. The structural reinforcement further comprising an activatable composition.

20 Claims, 8 Drawing Sheets

(51) Int. Cl.
*B62D 25/08* (2006.01)
*B62D 27/02* (2006.01)

(58) Field of Classification Search
CPC . Y10T 152/10828; Y02E 60/10; Y02E 60/50; H05K 1/165; Y02T 10/70
See application file for complete search history.

(56) References Cited

U.S. PATENT DOCUMENTS

| 2016/0194036 A1* | 7/2016 | Kurokawa | B62D 29/04 296/203.01 |
| 2016/0229456 A1* | 8/2016 | Boettcher | B62D 27/026 |

FOREIGN PATENT DOCUMENTS

| DE | 102014102372 A1 | 8/2015 |
| JP | 3391635 B2 | 3/2003 |
| JP | 2003252237 A | 8/2015 |

OTHER PUBLICATIONS

PCT Search Report & Written Opinion dated Nov. 14, 2019, Application No. PCT/US2019/047494.

\* cited by examiner

US 11,518,442 B2

CLAMSHELL STRUCTURAL REINFORCEMENT

FIELD

The present teachings pertain to a structural reinforcement, and more particularly to a structural reinforcement for the joint of a vehicle body frame.

BACKGROUND

The use of structural reinforcements in transportation vehicles for improving frame and body strength, mitigating vibration, and damping noise is generally known. Vehicle joints are subject to flexion and torsion from torques generated during the life of the vehicle, such as vibrations resulting from road conditions, collisions, loads exerted on the body frame, and the operation of mechanical systems in the vehicle, namely internal combustion engines.

Structural reinforcements typically conform to specified dimensions such that the desired profile of the vehicle is not interfered with. Furthermore, a structural reinforcement engineered to conform to a restrictive dimensional approach must provide similar or improved frame and body strength, vibration mitigation, noise damping, or a combination thereof. In addition, demands on the performance of structural reinforcements may require structural reinforcements to include certain intricate structural features such as ribs.

It would be attractive to have a structural reinforcement that can be constructed with a small profile while maintaining desirable torsional rigidity, vibration mitigation, noise damping, or a combination thereof. It would be attractive to have structural reinforcement that imparts an improved torsional rigidity on the vehicle body frame joint. It would be attractive to have a structural reinforcement that can feasibly be manufactured with intricate structural features. It would be attractive to have a structural reinforcement that is simple to manufacture while maintaining desirable torsional rigidity, vibration mitigation, noise damping, or a combination thereof.

SUMMARY

The teachings herein are directed to a reinforcement for a vehicle comprising: a frame half; an opposing half, and one or more ribs formed on the interior of both the frame half and the opposing half. The frame half and the opposing half form a complimentary fit with one another and are fastened together by a carrier adhesive disposed in the interface of the frame half and the opposing half. A vehicle adhesive may be dispensed on at least the external face of the reinforcement.

The reinforcement may be located at a structural joint of the body frame of the vehicle. The structural joint of the body frame of the vehicle may include a pocket. The dimensions of the pocket may be defined by the space created at the joint of two intersecting body frame components and a third body frame component connected to both of the two intersecting body frame components. The structural joint of the body frame may be located adjacent the cargo bay of the vehicle. The reinforcement may be located at a location of the body frame that is susceptible to torqueing forces such as that exerted by a closure or collision with another vehicle. The reinforcement may further comprise a flange circumscribing a periphery of the frame half, the opposing half, or both. The reinforcement may further comprise a mechanical attachment; wherein the mechanical attachment mechanically affixes the frame half and the opposing half together. The carrier adhesive may circumscribe a periphery of the reinforcement. The carrier adhesive may be dispensed at discrete locations along a periphery of the reinforcement; wherein the discrete locations make contact with the body frame when the reinforcement is installed. The vehicle adhesive may cover the whole surface area of the reinforcement. The carrier adhesive, the vehicle adhesive, or both may comprise an activatable composition.

The activatable composition may include an epoxy. The activatable composition may include a blowing agent. The activatable composition may be cured by elevated temperatures.

The one or more ribs of the frame half and the one or more ribs of the opposing half may share a corresponding orientation. A gap may exist between the one or more ribs of the frame half and the one or more ribs of the opposing half. The one or more ribs of the frame half and the one or more ribs of the opposing half may be in contact with one another. The carrier adhesive may be dispensed between the one or more ribs of the frame half and the one or more ribs of the opposing half. The one or more ribs of the frame half, the one or more ribs of the opposing half, or both may include a rib flange.

The teachings herein are further directed to a method of reinforcing a structural joint of a vehicle comprising molding a frame half; molding an opposing half; applying a carrier adhesive to the frame half, the opposing half, or both; and fitting the frame half and the opposing half together to form a reinforcement. A vehicle adhesive may be applied on one or more of the frame half and the opposing half. The method may further comprise curing the vehicle adhesive, the carrier adhesive, or both. The method may include affixing the reinforcement to a structural joint.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1:
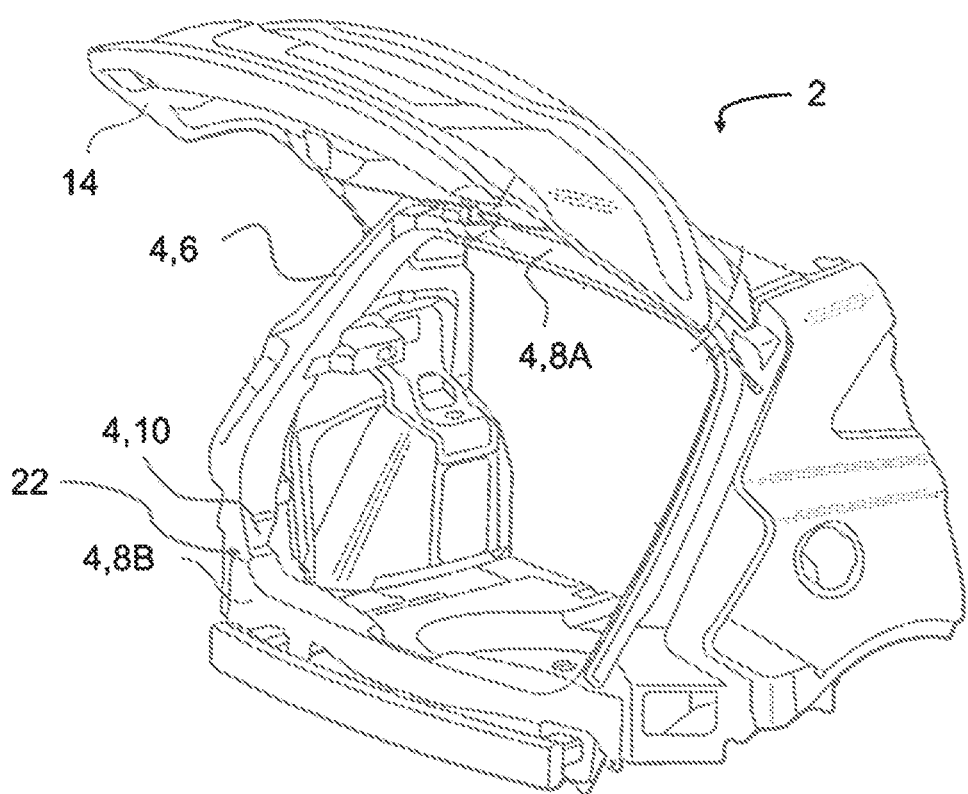
FIG. 1 illustrates a rear perspective view of a vehicle.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/720,812, filed Aug. 21, 2018, the contents of that application being incorporated by reference herein for all purposes.

The teachings herein are directed to structural reinforcements for vehicle cavities. The vehicles referenced herein may include automotive, recreational, or aerospace vehicles. The vehicle may specifically be an automotive vehicle. The vehicle may be classified as a sport utility vehicle (SUV). The vehicle may include a body frame and a liftgate.

The body frame may function to define the profile of the vehicle, provide structure to the vehicle, and support fixtures. For example, the fixtures may include a liftgate, door, hood, body panel, engine, and the like. The body frame may be comprised of individual body frame components. The body frame components may include a D-pillar, upper header, lower header, side member, Bracket, or a combination thereof. The body frame may be constructed from sheet metal. The sheet metal may comprise stainless steel, aluminium, magnesium, or a combination thereof. The body frame may define sub-structures such as a side door opening, a cargo bay opening, a sunroof opening, an engine bay opening, or the like.

The liftgate may function as a closure for the cargo bay, selectively closing to secure the cargo bay or opening to access the cargo bay. As referred to herein, a "closure" is a component of a vehicle having a hinged interface with the vehicle for selective opening and closing. For example, in addition to the liftgate, the closure may include a side door, hood, or the like. The liftgate may rotate about the D-pillar, upper header, lower header, side member, or a combination thereof. The liftgate may include a single hatch, two hatches, or three hatches. For example, if the liftgate includes two hatches, the first hatch may be rotatably connected to the side member located on the left side of the vehicle and the second hatch may be rotatably connected to the side member located on the right side of the vehicle. Furthermore, if the liftgate includes three hatches, the first hatch may be rotatably connected to the side member located on the left side of the vehicle, the second hatch may be rotatably connected to the side member located on the right side of the vehicle, and the third hatch may be rotatably connected to the upper header of the vehicle. The liftgate, as do other such vehicle closures as identified herein, may exert forces (i.e., torque) on the body frame component the closure is attached to as well as adjacent body frame components.

The D-pillar may function to support a load exerted by the upper header. The D-pillar may be located above a side member, substantially perpendicular to the upper header, and adjacent the rear window. Forces exerted on the D-pillar may be transferred to components adjacent the D-pillar such as the upper header or the side member.

The upper header may function to support a load exerted by the liftgate. The upper header may extend transverse from the right side of the vehicle to the left side of the vehicle. The upper header may connect the D-pillar located on the right side of the vehicle to the D-pillar located on the left side of the vehicle. The upper header may be in contact with the roof of the vehicle.

The lower header may function to support a load exerted on the vehicle frame, a load exerted by the liftgate, or a combination thereof. The lower header may extend transverse from the right side of the vehicle to the left side of the vehicle. The lower header may connect the side member located on the right side of the vehicle to the side member located on the left side of the vehicle. The lower header may be connected to the floor of the body frame.

The side member may function to connect the D-pillar to the lower header. The side member may intersect with the lower header at an angle. The angle may be no more than 135 degrees and no less than 45 degrees. Preferably, the angle is no more than 115 degrees and no less than 65 degrees. More preferably, the angle is no more than 110 degrees and no less than 85 degrees. The side member may support the weight of a liftgate. For example, the liftgate may form a rotatable connection to the side member located on the right side of the vehicle, the side member located on the left side of the vehicle, or a combination thereof. The side member may be biased into a state of flexion by the liftgate, a load exerted on the hood of the vehicle, the load of the body frame located above the side member, or a combination thereof. Flexion may be induced by vibrations generated by road travel.

The structural joint may function as the structural intersection of two or more body frame components. Preferably, the structural joint may be formed by the intersection of the side member and the lower header. The structural joint may be a structural weak point, subject to forces exerted on the body frame. The structural joint may be the fulcrum upon which the intersecting two or more body structures torque. More specifically, the structural joint may be the fulcrum about which the side member exhibits flexion, the fulcrum about which the lower header exhibits flexion, or a combination thereof. The structural joint may be susceptible to bending upon collision with another vehicle.

The structural reinforcement may function to provide torsional rigidity, vibration mitigation, noise damping, or a combination thereof. The structural reinforcement may be located at the interface of two structures that are susceptible to forces such as torsion. The term "structural reinforcement" as used herein may refer to a bracket, a single component reinforcement, a single component reinforcement with removed material, a clamshell reinforcement, or a combination thereof. A single component reinforcement may refer to a reinforcement that is formed as a single, integrally formed piece. The single component reinforcement with material removed may refer to a reinforcement that has material removed from the proximal surface of the reinforcement such that ribs may be formed within its structure. In addition, material removal may reduce the overall weight of the reinforcement. The structural reinforcement may be configured to fit, substantially form-fit (e.g., with a gap of no more than 3 mm at any given point between the clamshell reinforcement and the surrounding structure of the pocket), within the pocket. The structural reinforcement may be formed by injection molding, extrusion, pultrusion, or some combination thereof.

The bracket may function to brace one or more body frame components, preventing forces such as torque from inducing a state of flexion on the one or more body frame components. The bracket may provide structural support at the interface of the side member with the lower header. The bracket may be constructed of sheet metal. The bracket may comprise steel, aluminium, or magnesium. The bracket may be fastened to both the side member and the lower header. The angle of the bracket may be no more than 135 degrees and no less than 45 degrees. Preferably, the angle is no more than 115 degrees and no less than 65 degrees. More preferably, the angle is no more than 110 degrees and no less than 85 degrees.

The pocket may function to accept the structural reinforcement. The pocket may be a void in the construction of the vehicle defined by a space. The pocket may be defined by the space between two or more of the body frame components. Specifically, the pocket may be defined by the space created at the joint of two intersecting body frame components and a third body frame component connected to both of the two intersecting body frame components. More specifically, the pocket may be defined by the space in between the side member, the lower header, and the bracket.

The clamshell reinforcement may function to provide torsional rigidity, vibration mitigation, noise damping, or a combination thereof. The clamshell reinforcement may be configured in a two-piece construction. The two pieces of the clamshell reinforcement may exhibit a complimentary fit. As used herein, "complimentary" refers to components that are configured to mate with one another as evident by a substantially similar profile or opposing features of the components that align with each other. The clamshell reinforcement may include carrier halves, carrier adhesive, vehicle adhesive, a flange, a mechanical attachment, or a combination thereof. The design of the clamshell reinforcement as two complimentary pieces may enable feasible manufacturing of a structural reinforcement with ribs located on the interior of the structural reinforcement. For example, it may be difficult to obtain a ribbed internal structure by constructing a single component reinforcement structure using traditional molding methods (e.g., bladder molding, compression molding, autoclave and vacuum bag, mandrel wrapping, wet layup, chopper gun, filament winding, pultrusion, or resin transfer molding).

The clamshell carrier halves may function create a complimentary fit upon assembly. The carrier halves may include the frame half and the opposing half. The carrier halves may be installed on the vehicle before the complimentary halves are assembled or after the complimentary halves are assembled. Preferably, the carrier halves are first installed on the body frame after the carrier halves come together to a complimentary fit. The frame half may be installed on a side member and the opposing half may be installed on a bracket; then the bracket may be installed over the structural joint created by the side member and a lower header. As a result the frame half and the carrier half form a complimentary fit upon installation of the bracket over the structural joint. The frame half may be installed on the side member first, then the opposing half may be installed on the frame half, then the bracket may be installed over the opposing half. The frame half and the opposing half may be assembled; then the assembled clamshell reinforcement may be installed in the structural joint. The carrier halves may be constructed from any suitable polymer or fiber reinforced polymer. The carrier halves may be constructed from fiberglass, glass filled nylon, or a combination thereof. The carrier halves may have a thickness of no less than 1 mm and no more than 10 mm. More preferably, the carrier halves may have a thickness of no less than 2 mm and no more than 7 mm. Even more preferably, the carrier halves may have a thickness of no less than 3 mm and no more than 5 mm. The carrier halves may include one or more of a carrier adhesive and vehicle adhesive.

The frame half may function to be accepted by the side member. The frame half may include one or more of an external face, longitudinal faces, and latitudinal faces. The external face may be oriented toward the side member. The external face may form a substantially complimentary fit with the side member. The longitudinal faces may be oriented such that the first longitudinal face is oriented toward the lower header and the second longitudinal face is oriented parallel to and on the distal end of the clamshell reinforcement from the first longitudinal face. The latitudinal faces may be oriented such that they are substantially perpendicular to and extending between the longitudinal faces. The frame half may include sub-structures such as flanges, ribs, negative valleys, mechanical attachments, rib flanges, gaps, or any combination thereof.

The opposing half may function to be accepted by the bracket. The opposing half may include one or more of an external face, longitudinal faces, and latitudinal faces. The external face may be oriented toward the Bracket. The external face may form a substantially complimentary fit with the Bracket. The longitudinal faces may be oriented such that the first longitudinal face is oriented toward the lower header and the second longitudinal face is oriented parallel to and on the distal end of the clamshell reinforcement from the first longitudinal face. The latitudinal faces may be oriented such that they are substantially perpendicular to and extending between the longitudinal faces. The frame half may include sub-structures such as flanges, ribs, negative valleys, mechanical attachments, rib flanges, gaps or any combination thereof.

The flange may function as the contact interface between the frame half and the opposing half. The flange may circumscribe the periphery of the frame half, the opposing half, or both; wherein the periphery is the edge of the frame half, the opposing half, or both that is protruded toward the other complimentary half and makes contact with the other complimentary piece. The flange may provide a surface upon which the carrier adhesive is dispensed. The flange may include a mechanical attachment. The flange of the frame half and the flange of the opposing half may be configured to exhibit a complimentary fit. A carrier adhesive may be applied to the flange prior to fitting the frame half and the opposing half together.

The mechanical attachment may function to affix the frame half and the opposing half together. The mechanical attachment may include an attachment means which enable secure mechanical attachment upon biasing the frame half against the opposing half or biasing the opposing half against the frame half. The mechanical attachment may include clasps, push pins, snaps, or a combination thereof.

The mechanical attachment may be utilized to affix the frame half and the opposing half, in conjunction with the carrier adhesive.

The ribs may function to provide the carrier halves structural support. The ribs may inhibit the bending or torsion of the carrier halves. The ribs may be structures molded into the carrier halves. The ribs may be structures depressed into the carrier halves. The ribs may include two sets of ribs that run in directions perpendicular to each other. The ribs may run longitudinal, latitudinal, or both. The ribs may run across the entire longitudinal distance or only a portion of the entire longitudinal distance of the carrier halves. The ribs may run across the entire latitudinal distance or only a portion of the entire latitudinal distance of the carrier halves. The ribs may extend, perpendicularly, a uniform distance from the surface of the carrier halves or a variable distance. Formation of the ribs results in negative valleys between the ribs. The ribs of the frame half and the ribs of the carrier half may have a gap between them or the ribs may be free of a gap. If the ribs are free of a gap, the ribs may include rib flanges.

The rib flanges may function to provide a contact surface between the ribs. The rib flanges of the frame half may substantially line up with the rib flanges of the opposing half. The rib flanges of the frame half may form a direct interfacial contact with the rib flanges of the opposing half. The rib flanges of the frame half and the rib flanges of the opposing half may have a layer of carrier adhesive dispensed between them. If so, the layer of carrier adhesive is dispensed on the rib flanges prior to fitting the frame half and the opposing half together. Preferably, the carrier adhesive is applied to the rib flanges during the same step as it is applied to the flange.

The carrier adhesive may function to adhere the frame half to the opposing half. The carrier adhesive may be dispensed along the perimeter of the frame half, the opposing half, or a combination thereof. The carrier adhesive may be dispensed along the entire perimeter of the clamshell reinforcement or in discrete segments. The carrier adhesive may exhibit foaming characteristics upon exposure to a stimulus or be free of foaming characteristics. Preferably, the carrier adhesive is free of foaming characteristics. The carrier adhesive may extend from the exterior of the clamshell reinforcement to the interior of the clamshell reinforcement. The carrier adhesive may comprise an epoxy resin composition. The carrier adhesive may include one or more additives.

The vehicle adhesive may function to adhere the carrier halves to the body frame. The vehicle adhesive may be dispensed on the carrier halves, specifically the external face, the longitudinal face, the latitudinal face, or a combination thereof. The vehicle adhesive may be dispensed on the entirety of the external face, the longitudinal face, the latitudinal face or in discrete segments of the external face, the longitudinal face, the latitudinal face. The vehicle adhesive may exhibit foaming characteristics or be free of foaming characteristics. The vehicle adhesive and the carrier adhesive may have the same chemical composition or may vary in chemical composition.

The carrier adhesive, the vehicle adhesive, or both may comprise an activatable composition. Specifically, the carrier adhesive, the vehicle adhesive, or both may comprise an epoxy resin composition. The carrier adhesive may include one or more additives. As referred to herein, "activatable composition" denotes a chemical composition that is curable and/or foamable (e.g., hardened) upon application of stimuli. The activatable composition may be cured by the application of heat, pressure, radiation, or the addition of a chemical. Preferably, the activatable composition may be cured by heat. More specifically, the activatable composition may be cured by the heat generated by a baking step following an e-coat process.

The epoxy resin composition of the carrier adhesive, the vehicle adhesive, or both may comprise any conventional dimeric, oligomeric, or polymeric epoxy material containing at least one epoxy functional group (e.g., reactive oxirane rings polymerizable by a ring opening reaction). The term "epoxy resin" may refer to one epoxy resin or a combination of epoxy resins. The epoxy resin may increase the adhesion, flow properties, or both of the adhesive. The epoxy resin may be hardened due to the presence of reactive oxirane rings in the epoxy resin. For example, upon heating, the oxirane rings may react with a curing agent resulting in crosslinking and consequently hardening of the epoxy resin. The strength of the epoxy resin is attributed to the degree of cross-linking. The epoxy resin may be di-functional, tri-functional, multi-functional, or a combination thereof. Preferably, the epoxy resin is di-functional. The epoxy resin may be aliphatic, cycloaliphatic, aromatic, or a combination thereof. More specifically, the epoxy resin may be selected from the group consisting of bisphenol-A epoxy resins (e.g., diglycidyl ethers of bisphenol-A), bisphenol-F epoxy resins (e.g., diglycidyl ethers of bisphenol-F), novolac epoxy resins (e.g., epoxy phenol novolacs (EPN) and epoxy cresol novolacs (ECN)), aliphatic epoxy resins (e.g., glycidyl epoxy resins and cycloaliphatic epoxides), glycidylamine epoxy resins (e.g., triglycidyl-p-aminophenol and N,N,N,N-tetraglycidyl-4,4-methylenebis benzylamine) or a combination thereof. The epoxy resin may be supplied as a solid (e.g., pellets, chunks, pieces), as a liquid, or a combination thereof. The term "solid" when used in combination with "epoxy resin" refers to an epoxy resin that is solid at a temperature of 23° C. The term "liquid" when used in combination with "epoxy resin" refers to an epoxy resin that is liquid at a temperature of 23° C. The carrier adhesive, the vehicle adhesive, or both may comprise the epoxy resin in the amount of no less than about 2% by weight, more preferably no less than 15% by weight, and more preferably no less than 25% by weight epoxy resin. The carrier adhesive, the vehicle adhesive, or both may comprise no more than about 70% by weight, more preferably no more than 55% by weight, and more preferably no more than 45% by weight epoxy resin.

The carrier adhesive, vehicle adhesive, or both may include one or more additives which may function to modify the physical properties of adhesive. The additives may include a curing agent, a curing agent accelerator, a blowing agent, a blowing agent accelerator, a reinforcing filler, a reinforcing fiber, a toughening agent, a flexibilizer or a combination thereof. The additives may be dispersed within the epoxy resin prior to applying the adhesive to the structural reinforcement.

The curing agent may function to cure the epoxy thereby achieving crosslinking (hardening) of the epoxy. The term "curing agent" may refer to one or a combination of curing agents. The curing agent may be activated by exposure to other substances or by exposure to a condition such as radiation, moisture, pressure, heat, or the like. Preferably, the curing agent may be activated by heat. The curing agent may be di-functional, tri-functional, or multi-functional. The curing agent may be aliphatic or aromatic. Preferably, the curing agent may be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolac resins, copolymers such as those of phenol terpene, polyvinyl phenol, or bisphenol-A formaldehyde copolymers, bishydroxyphenyl alkanes or the like), dihydrazides, sulfonamides, diamino diphenyl sulfone, anhydrides, mercaptans, imidazoles, ureas, tertiary amines, boron trifluoride complexes, or a combination thereof. Preferably, the curing agent is selected from modified and unmodified polyamines or polyamides such as triethylenetetramine, diethylenetriamine, tetraethylenepentamine, cyanoguanidine, dicyandiamides and the like. Examples of suitable curing agents are commercially available, under the tradename Dyhard®, from AlzChem Group AG. Further examples of suitable curing agents are commercially available, under the tradename Amicure®, from Air Products and Chemicals, Inc. The carrier adhesive, the vehicle adhesive, or both may comprise the curing agent in the amount of about 0.001% to about 9.0% by weight, more preferably, about 0.1% to about 6.0% by weight, or even more preferably, about 2.0% by weight to about 6.0% by weight.

The curing accelerator may function to increase the cure rate of the epoxy resin. The curing accelerator may include modified or unmodified urea. The term "curing accelerator" may refer to one or a combination of curing accelerators. Specifically, the curing accelerator may include methylene bis(phenyl dimethyl urea), imidazole, blocked amines or a combination thereof. Examples of suitable curing accelerators include those sold under the tradename Omicure® (e.g., U52), commercially available from Emerald Performance Materials. The carrier adhesive, the vehicle adhesive, or both may comprise the curing accelerator in the amount of about 0.001% to about 9.0% by weight, more preferably, about 0.1% to about 6.0% by weight, or even more preferably, about 2.0% by weight to about 6.0% by weight.

The blowing agent may function to produce a cellular structure within the epoxy resin. The term "blowing agent" may refer to one or a combination of blowing agents. The blowing agent may produce a cellular structure by producing an inert gas upon activation and expanding the surrounding epoxy resin (e.g., chemical blowing agent). Alternatively, the blowing agent may produce a cellular structure by the expansion of polymeric shells (e.g., physical blowing agent). The blowing agent may produce an open or closed cellular structure. The composition of the blowing agent may depend upon the type of cellular structure desired. For example, the composition of the blowing agent may have an effect on the cellular structure, the amount of expansion, and the rate of expansion. The blowing agent may include a chemical blowing agent, a physical blowing agent, or a combination thereof. The carrier adhesive, the vehicle adhesive, or both may comprise the blowing agent in the amount of about 0.001% to about 2.0% by weight.

Chemical blowing agents may include compounds comprising one or more nitrogen containing groups such as amides, amines, and the like. Examples of suitable chemical blowing agents may include dinitrosopentamethylenetetramine, azodicarbonamide, dinitroso-pentamethylenetetramine, 4,4'oxy-bis-(benzene-sulphonylhydrazide), trihydrazinotriazine and N, N'-dimethyl-N, N'-dinitrosoterephthalamide.

Physical blowing agents may include solvent filled polymeric shells that soften and expand upon exposure to heat. Examples of suitable physical blowing agents may include physical blowing agents sold under the tradename Expancel®, commercially available from Akzo Nobel.

The blowing accelerator may function to increase the rate of expansion of the adhesive. The term "blowing accelerator" may refer to one or a combination of blowing accelerators. The blowing accelerator may increase the rate at which the blowing agents form inert gasses. The blowing accelerator may comprise a metal salt such as zinc oxide. Alternatively, the blowing accelerator may comprise an organic base such as urea. Alternatively, the blowing accelerator may comprise an organic acid such as adipic acid or benzoic acid. Alternatively, zinc benzene sulfonate may be used. The carrier adhesive, the vehicle adhesive, or both may comprise the blowing accelerator in the amount of about 0.001% to about 2.0% by weight.

The toughening agent may function to distribute energy within the reinforcement. The term "toughening agent" may refer to one or a combination of toughening agents. The toughening agent may include a mixture of various toughening agents. The toughening agent may contribute to an increased T-Peel strength. The toughening agent may comprise thermoplastics, thermosets or thermosettables, elastomers, combinations thereof or the like. Preferably, the toughening agent comprises an elastomer (including elastomer containing materials), a core/shell polymer (which may include but are not limited to elastomers), or a combination thereof.

For the purpose of specification, the term "core/shell impact modifier" refers to an impact modifier wherein a substantial portion (e.g., greater than 30%, 50%, or 70% by weight or more) thereof is comprised of a first polymeric material (e.g., the first material or the core material) that is substantially entirely encapsulated by a second polymeric material (e.g., the second material or the shell material). The first and second polymeric materials, as used herein, can be comprised of one, two, three or more polymers that are combined and/or reacted together (e.g., sequentially polymerized) or may be part of separate or the same core/shell systems.

The flexibilizer may function to provide, to the adhesive, the property of flexibility without breaking. The term "flexibilizer" may refer to one or a combination of flexibilizers. The flexibilizer may comprise polymers without epoxy reactivity. The term "flexibilizer" refers to a single flexibilizer or to a combination of different flexibilizers. Flexibilizers may be present in the carrier adhesive, the vehicle adhesive, or both in the amount of at least about 2% by weight, more preferably at least about 3% by weight, and even more preferably at least about 5% by weight. Flexibilizers may be present in the carrier adhesive, the vehicle adhesive, or both in the amount of no more than about 50% by weight, more preferably no more than about 35% by weight, and even more preferably no more than about 20% by weight. Suitable flexibilizers may include polyvinyl esters, polyvinyl butyral resins, amine-modified polymers (e.g., amine-terminated polyethers), epoxy-modified polymers (e.g., epoxidized polysulfides, epoxy-dimer acid elastomers, polyurethane-modified epoxy, epoxy-terminated polyethers), cashew nutshell liquid derivatives (e.g., epoxidized liquids commercially available under the tradename Cardolite®, such as NC-514 and Lite 2513HP), or a combination thereof. Amine-modified polymers, epoxy modified polymers, or both may include polymers that are thermoplastics, thermosets, elastomers, or a combination thereof. The polymers may be modified with aromatic, non-aromatic epoxy, bisphenol-F type epoxy, bisphenol-A type epoxy, or a combination thereof.

FIG. 1 illustrates a rear perspective view of a vehicle 2. The vehicle 2 includes a body frame 4. The body frame 4 includes a D-pillar 6, a side member 10, an upper header 8A, and a lower header 8B. The intersection of the side member 10 and the lower header 8B forms the structural joint 22. The vehicle 2 further includes a liftgate 14, which is rotatably connected to the upper header 8A such that upon opening the liftgate 14 rotates up and away from the lower header 8B.

Figure 2A:
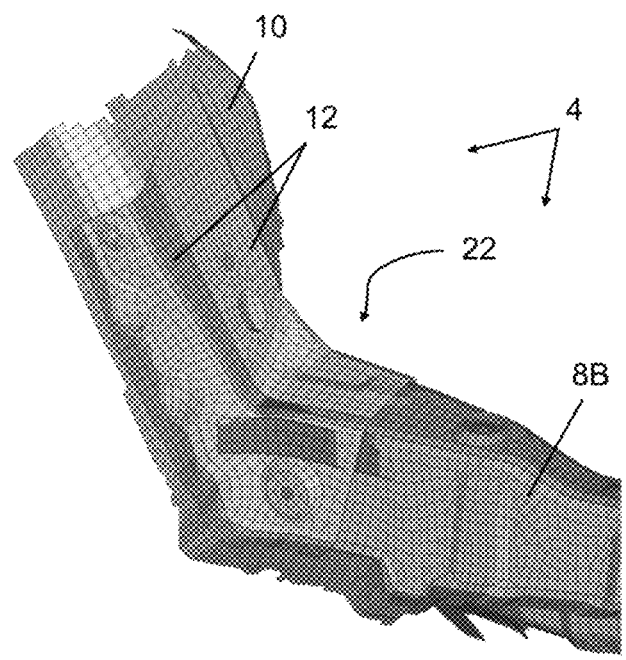
FIG. 2A illustrates a segmented perspective view of a body frame.

FIG. 2A illustrates a segmented perspective view of a body frame 4. The body frame 4 includes the side member 10 and the lower header 8B, which intersect to form the structural joint 22. Between the side member 10 and the lower header 8B runs the bracket 12.

Figure 2B:
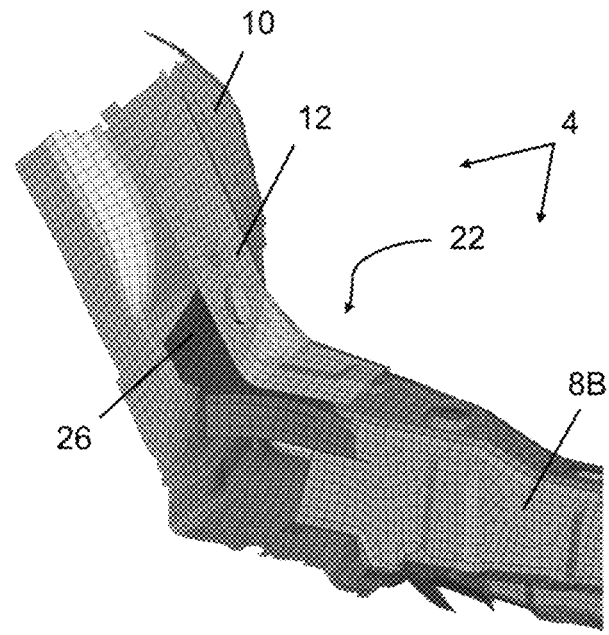
FIG. 2B illustrates a segmented perspective view of a body frame.

FIG. 2B illustrates a segmented perspective view of a body frame 4. The body frame 4 includes the side member 10 and the lower header 8B, which intersect to form the structural joint 22. Between the side member 10 and the lower header 8B runs the bracket 12. A side portion of the bracket 12 is removed, exposing the pocket 26, which is a space defined by the boundary of the side member 10, the lower header 8B, and the bracket 12.

Figure 3:
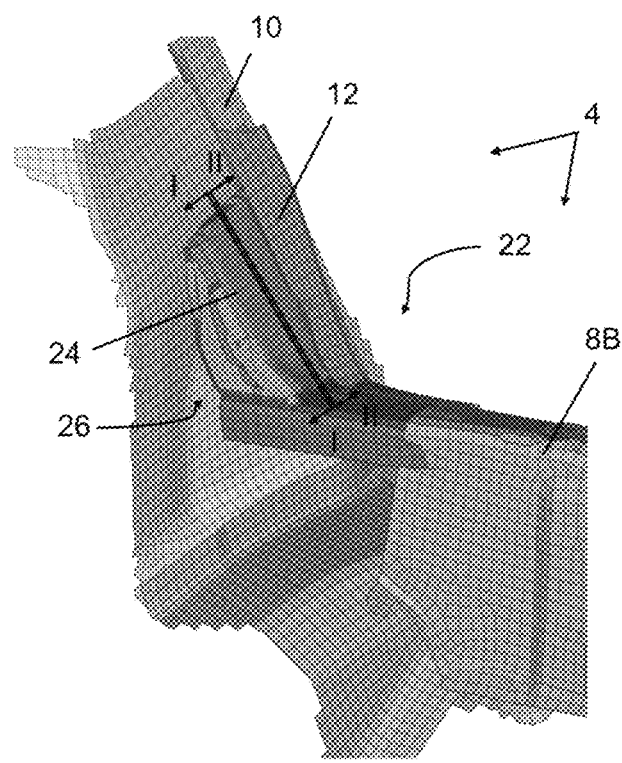
FIG. 3 illustrates a segmented perspective view of a body frame.

FIG. 3 illustrates a segmented perspective view of a body frame 4. The body frame 4 includes the side member 10 and the lower header 8B, which intersect to form the structural joint 22. Between the side member 10 and the lower header 8B runs the bracket 12. A side portion of the bracket 12 is removed, exposing the pocket 26, which is a space defined by the boundary of the side member 10, the lower header 8B, and the bracket 12. Fitting within the space of the pocket 26 is the clamshell reinforcement 24.

Figure 4A:
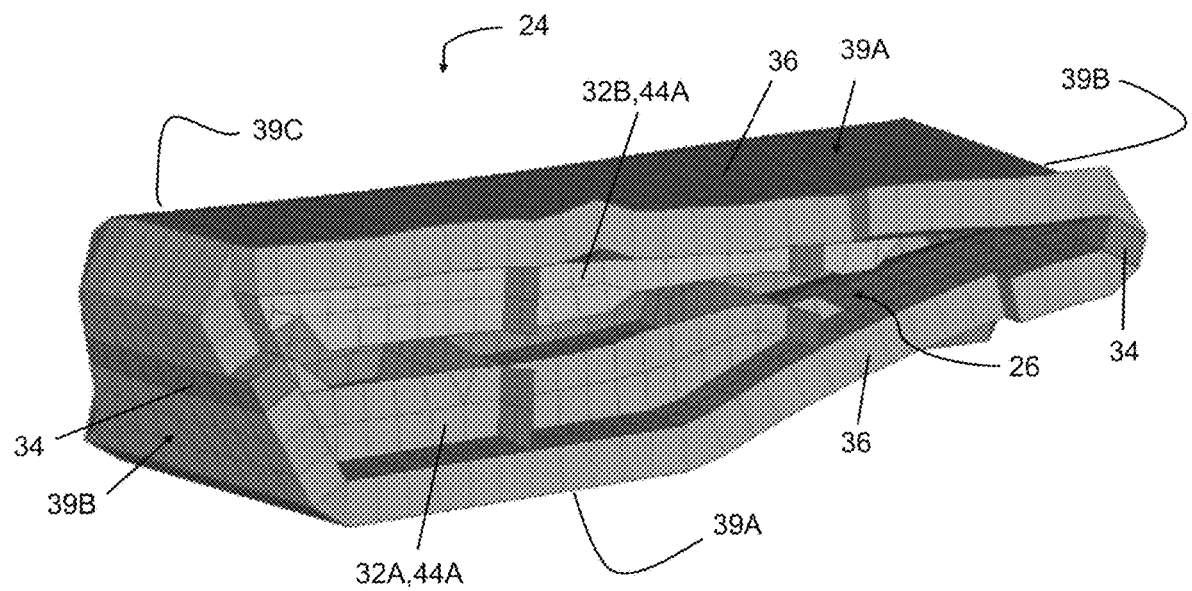
FIG. 4A illustrates a bisected view of a clamshell reinforcement along line I-I.

FIG. 4A illustrates a bisected view of a clamshell reinforcement 24 along line I-I. The clamshell reinforcement 24 includes a frame half 32A and an opposing half 32B. The frame half 32A and opposing half 32B includes ribs 44A, an external face 39A, a longitudinal face 39B, and a latitudinal face 39C. The external face 39A, the longitudinal face 39B, and the latitudinal face 39C of the frame half 32A and the opposing half 32B includes a vehicle adhesive 36. A carrier adhesive 34 is disposed in the interface of the frame half 32A and the opposing half 32B. The clamshell reinforcement further includes a gap 26 between the ribs 44A of the frame half 32A and the opposing half 32B.

Figure 4B:
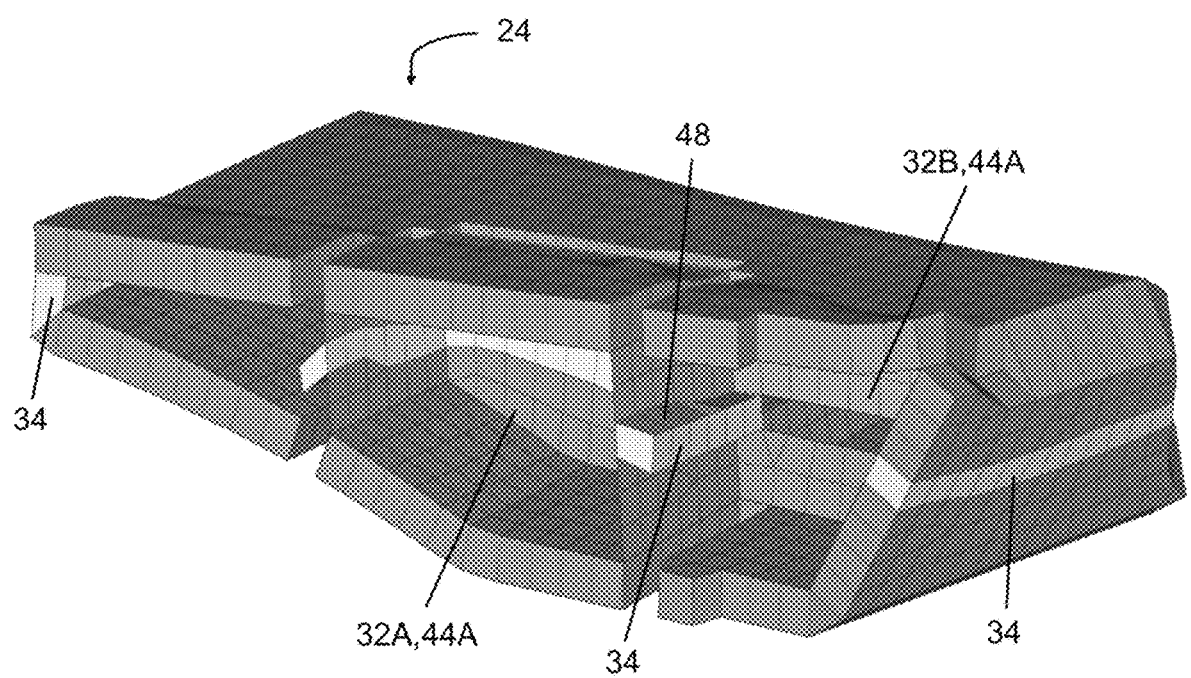
FIG. 4B illustrates a bisected view of a clamshell reinforcement along line II-II.

FIG. 4B illustrates a bisected view of a clamshell reinforcement 24 along line II-II. The clamshell reinforcement 24 includes a frame half 32A and an opposing half 32B. The frame half 32A and opposing half 32B includes ribs 44A. The ribs 44A include rib flanges 48. Between the rib flanges 48 is dispensed a carrier adhesive 34 thereby eliminating the gap (not shown) between the ribs 44A of the frame half 32A and the opposing half 32B.

Figure 5A:
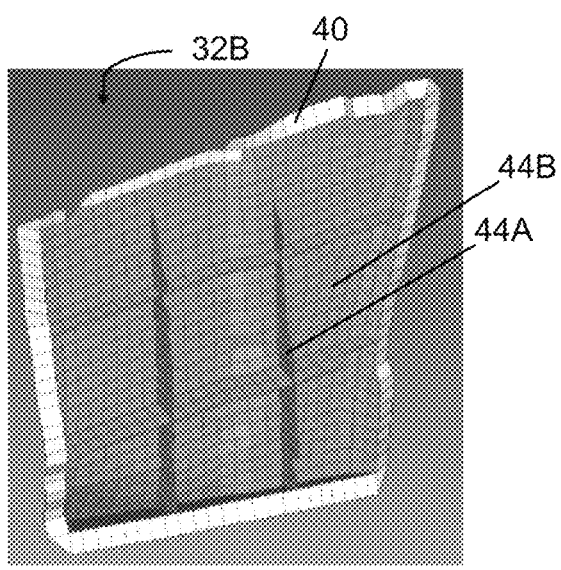
FIG. 5A illustrates a perspective view of an opposing half of a clamshell reinforcement.

FIG. 5A illustrates a perspective view of an opposing half 32B of a clamshell reinforcement 24. The opposing half 32B includes two sets of ribs 44A, which extend perpendicular to each other. Ribs 44A in parallel to each other are substantially equidistant from each other.

Figure 5B:
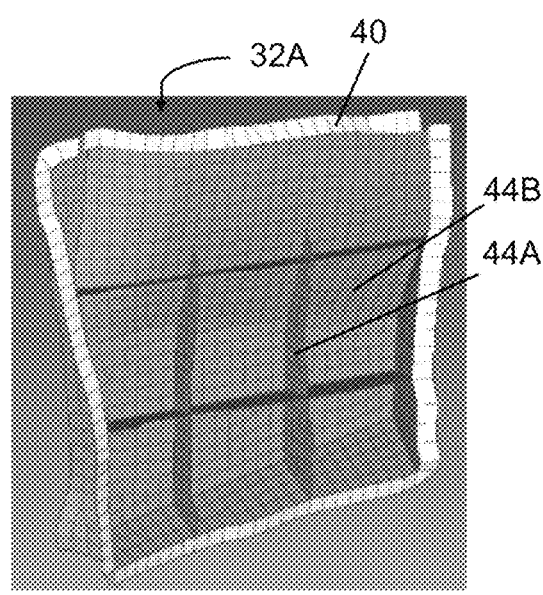
FIG. 5B illustrates a perspective view of a frame half of a clamshell reinforcement.

FIG. 5B illustrates a perspective view of a frame half 32A of a clamshell reinforcement 24. The frame half 32A includes two sets of ribs 44A, which extend perpendicular to each other. Ribs 44A in parallel to each other are substantially equidistant from each other.

Figure 6A:
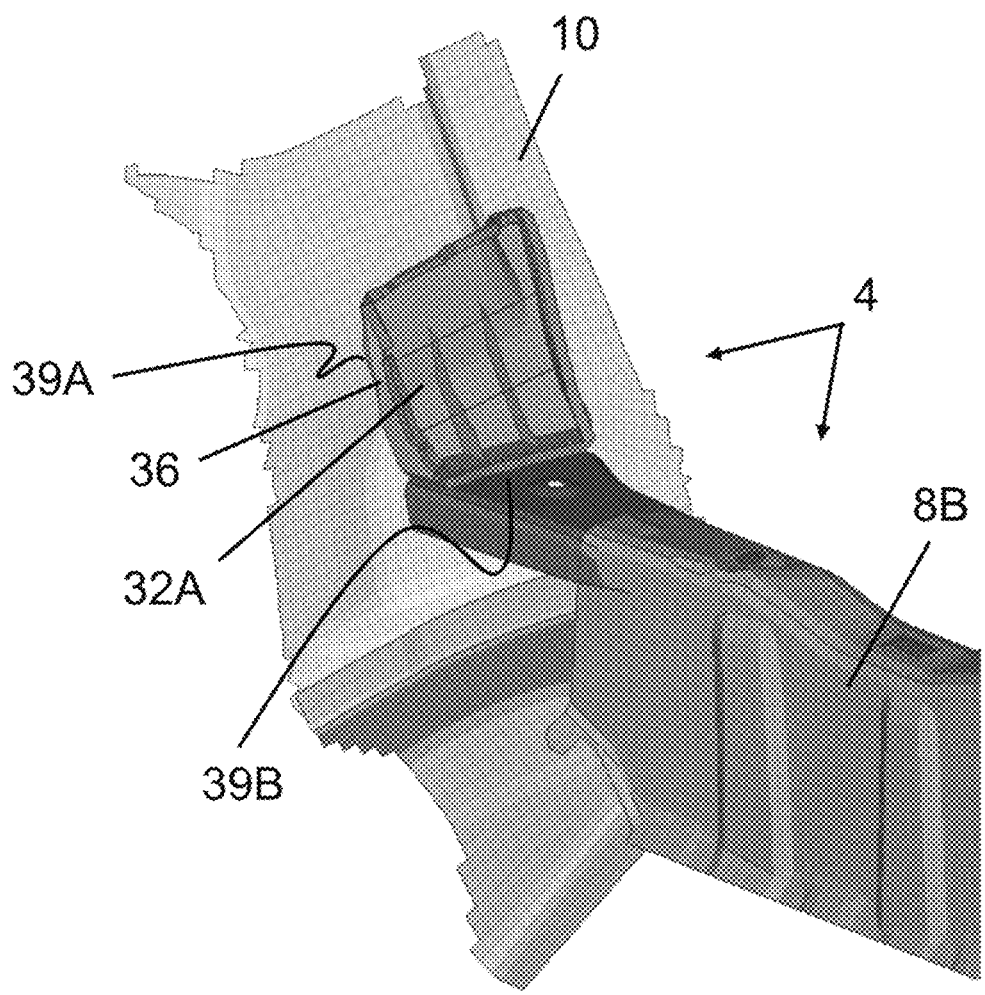
FIG. 6A illustrates a segmented perspective view of a body frame with a frame half of a clamshell reinforcement installed.

FIG. 6A illustrates a segmented perspective view of a body frame 4 with a frame half 32A of a clamshell reinforcement 24 installed. The body frame 4 includes a side member 10 and a lower header 8B. The external face 39A of the frame half 32A is oriented toward the side member 10 such that the vehicle adhesive 36, disposed between the external face 39A and the side member 10, contacts the side member 10. Furthermore, the longitudinal face 39B of the frame half 32A is oriented toward the lower header 8B such that the vehicle adhesive 36 disposed between the longitudinal face 39B and the lower header 8B contacts the lower header 8B.

Figure 6B:
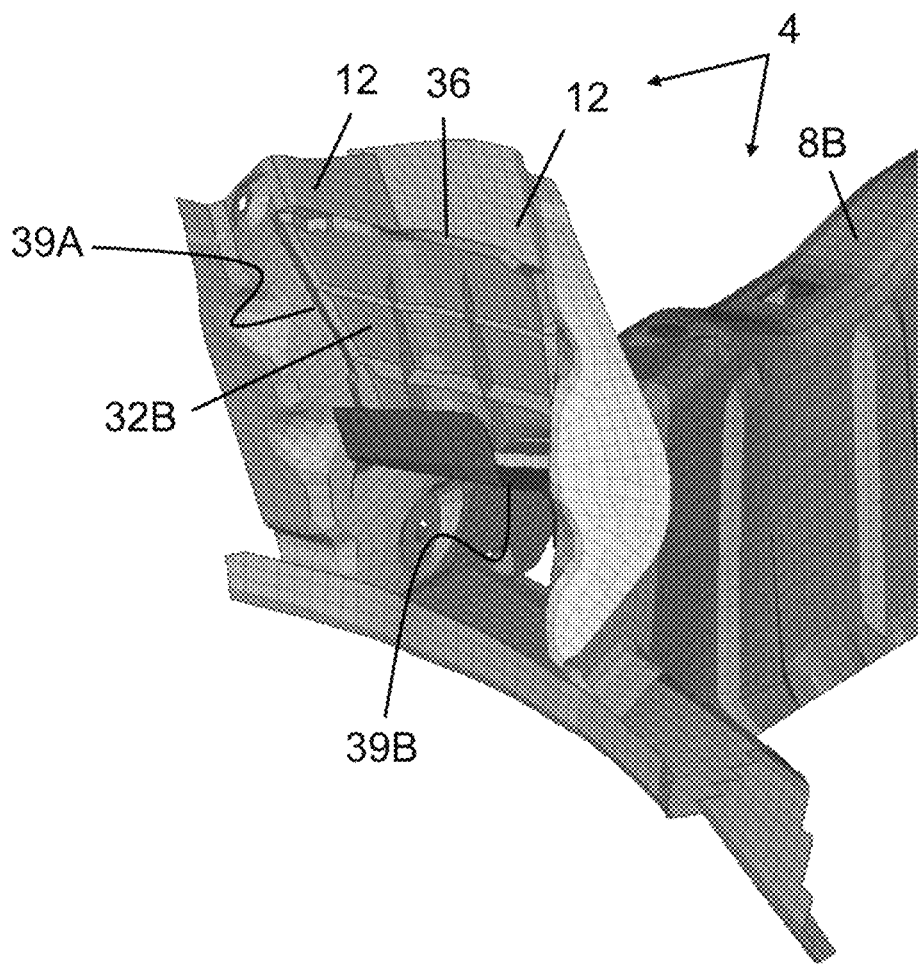
FIG. 6B illustrates a segmented perspective view of a body from with an opposing half of a clamshell reinforcement installed.

FIG. 6B illustrates a segmented perspective view of a body frame 4 with an opposing half 32B of a clamshell reinforcement 24 installed. The body frame 4 includes a bracket 12 and a lower header 8B. The external face 39A of the opposing half 32B is oriented toward the bracket 12 such that the vehicle adhesive 36, disposed between the external face 39A and the bracket 12, contacts the bracket 12. Furthermore, the longitudinal face 39B of the opposing half 32B is oriented toward the lower header 8B such that the vehicle adhesive 36 disposed between the longitudinal face 39B and the lower header 8B contacts the lower header 8B.

Figure 7:
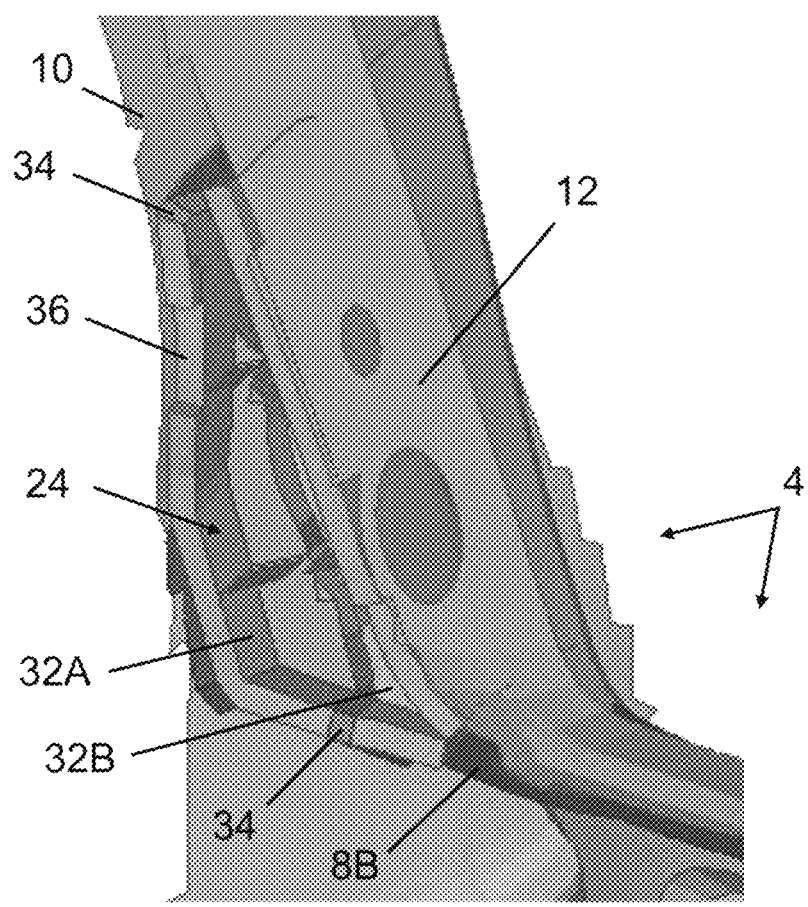
FIG. 7 illustrates a bisected view of a body frame and clamshell reinforcement along line II-II.

FIG. 7 illustrates a bisected view of a body frame 4 and clamshell reinforcement 24 along line II-II. The vehicle adhesive 36 fills the space between the side member 10, the bracket 12, and the lower header 8B. The carrier adhesive 34 dispensed between the frame half 32A and the opposing half 32B runs through the layer of vehicle adhesive 36 and sits flush against the side member 10.

Table 1 below illustrates the performance of structural reinforcements as described herein having different configurations. Torsional rigidity was measured in units of kN/rad. "Improvement to structural joint" refers to the torsional rigidity improvement over the bare structural joint. "Improvement over Bracket" refers to the torsional rigidity improvement imparted by the bracket subtracted from the torsional rigidity improvement imparted by the various structural reinforcement configurations.

TABLE 1

| Structural Reinforcement Configuration | Improvement to structural joint | Improvement over Bracket |
|---|---|---|
| Bracket | +8.6% | — |
| Bracket + Single Component | +10.2% | +1.6% |
| Bracket + Single Component, Removed Material | +9.2% | +0.6% |
| Bracket + Clamshell Reinforcement | +10.0% | +1.4% |

As used herein, unless otherwise stated, the teachings envision that any substrate of a genus (list) may be excluded from the genus; and/or any substrate of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

I claim:

1. A reinforcement for a vehicle comprising:
   a. a frame half,
   b. an opposing half, and
   c. one or more ribs formed on the interior of both the frame half and the opposing half;
      wherein the frame half and the opposing half form a complimentary fit with one another and are fastened together by a carrier adhesive disposed in the interface of the frame half and the opposing half; and
      wherein a vehicle adhesive is dispensed on at least the external face of the reinforcement.

2. The reinforcement of claim 1, wherein the reinforcement is located at a structural joint of the body frame of the vehicle.

3. The reinforcement of claim 2, wherein the structural joint of the body frame of the vehicle includes a pocket; wherein the dimensions of the pocket may be defined by the space created at the joint of two intersecting body frame components and a third body frame component connected to both of the two intersecting body frame components.

4. The reinforcement of claim 2, wherein the structural joint of the body frame is located adjacent the cargo bay of the vehicle.

5. The reinforcement of claim 1, wherein the reinforcement is located at a location of the body frame that is susceptible to torquing forces such as that exerted by a closure or collision with another vehicle.

6. The reinforcement of claim 1, wherein the reinforcement further comprises a flange circumscribing a periphery of the frame half, the opposing half, or both.

7. The reinforcement of claim 2, wherein the reinforcement further comprises a mechanical attachment; wherein the mechanical attachment mechanically affixes the frame half and the opposing half together.

8. The reinforcement of claim 6, wherein the carrier adhesive circumscribes a periphery of the reinforcement.

9. The reinforcement of claim 1, wherein the carrier adhesive is dispensed at discrete locations along a periphery of the reinforcement;
   wherein the discrete locations make contact with the body frame when the reinforcement is installed.

10. The reinforcement of claim 1, wherein the vehicle adhesive covers the whole surface area of the reinforcement.

11. The reinforcement of claim 1, wherein the carrier adhesive, the vehicle adhesive, or both comprises an activatable composition.

12. The reinforcement of claim 11, wherein the activatable composition includes an epoxy.

13. The reinforcement of claim 11, wherein the activatable composition includes a blowing agent.

14. The reinforcement of claim 13, wherein the activatable composition is cured by elevated temperatures.

15. The reinforcement of claim 1, wherein the one or more ribs of the frame half and the one or more ribs of the opposing half share a corresponding orientation.

16. The reinforcement of claim 15, wherein a gap exists between the one or more ribs of the frame half and the one or more ribs of the opposing half.

17. The reinforcement of claim 15, wherein the one or more ribs of the frame half and the one or more ribs of the opposing half are in contact with one another.

18. The reinforcement of claim 1, wherein the carrier adhesive is dispensed between the one or more ribs of the frame half and the one or more ribs of the opposing half.

19. The reinforcement of claim 1, wherein the one or more ribs of the frame half, the one or more ribs of the opposing half, or both include a rib flange.

20. A method of reinforcing a structural joint of a vehicle with the reinforcement of claim 1 comprising:
   d. molding the frame half;
   e. molding the opposing half;
   f. applying the carrier adhesive to the frame half, the opposing half, or both; and
   g. fitting the frame half and the opposing half together to form the reinforcement of claim 1;
   wherein on the frame half and the opposing half, the vehicle adhesive is applied.

* * * * *